United States Patent [19]
Richards

[11] Patent Number: 5,313,281
[45] Date of Patent: May 17, 1994

[54] VIDEO TO FILM CONVERSION

[75] Inventor: John W. Richards, Stockbridge, United Kingdom

[73] Assignee: Sony United Kingdom Ltd., Staines, United Kingdom

[21] Appl. No.: 80,204

[22] Filed: Jun. 23, 1993

[30] Foreign Application Priority Data

Sep. 29, 1992 [GB] United Kingdom ............... 9220527

[51] Int. Cl.⁵ ............................................. H04N 7/01
[52] U.S. Cl. ................................. 348/443; 358/345; 348/441
[58] Field of Search ............... 358/140, 345, 214, 97; H04N 7/01

[56] References Cited

U.S. PATENT DOCUMENTS

| | | | |
|---|---|---|---|
| 3,716,670 | 2/1973 | Lowry | 358/345 |
| 4,473,849 | 9/1984 | Cool | 358/345 |
| 5,132,793 | 7/1992 | Hirahata | 358/11 X |

FOREIGN PATENT DOCUMENTS 2231228 11/1990 United Kingdom .

Primary Examiner—Victor R. Kostak
Attorney, Agent, or Firm—William S. Frommer; Alvin Sinderbrand

[57] ABSTRACT

In a method of converting a 60 field/s 2:1 interlaced video signal to 24 frame/s film, for each sequence of five input fields: the fields of at least one pair of the input fields are each progressive scan converted to form a pair of frames, and a weighted addition of the frames is made on a pixel-by-pixel basis to form an output video frame with a shifted temporal centroid, so that the temporal centroids of the output video frames are equally spaced. The output video frames are then recorded on film. In another method, the progressive scan conversion and weighted addition is performed by a single filter.

32 Claims, 4 Drawing Sheets

VIDEO TO FILM CONVERSION

BACKGROUND OF THE INVENTION

1. Field of the Invention

This invention relates to video to film conversion.

2. Description of the Prior Art

For some years now it has been possible to transfer video to film using an electron beam recording (EBR) system. When converting HDVS 60 Hz (60 fields/s) 2:1 interlace format video to 24 Hz (24 frames/s) film using this system, a video signal corresponding to 24 frame/s is produced from the 60 Hz video signal, and the 24 Hz video signal is used to drive an electron beam recorder for recording the 24 Hz frames on film. The frame rate conversion is achieved in this system by a "field-combined drop-field" process.

In this process, two output film frames are produced from every five input video fields. The first and second input fields are "field combined" to produce a first video frame, the third and fourth input video fields are "field combined" to produce a second video frame, the fifth input video field is dropped or ignored, and the first and second video frames are recorded on film by the electron beam recorder. By field combining, it is meant that the odd lines of the video frame are made up of the lines of the odd input video field, and the even lines of the video frame are made of the lines of the even input video field.

The drop field process is a very crude form of standards conversion which introduces a 12 Hz judder component due to the loss of every fifth field of the original 60 Hz video. There is also a reduction in dynamic resolution (or an introduction of motion smearing) since temporally offset fields are combined to produce each frame of the film so that the outline of moving objects can appear more blurred than the blur caused by camera integration effects alone. This additional motion blur will be referred to as "interlace smear". Thus, while the field-combined drop-field system offers picture quality which is adequate for the majority of the time, motion rendition is poor due to the 12 Hz judder in addition to the 24 Hz strobing introduced by the film projector, and there is reduced dynamic resolution.

In order to overcome the above problems, an elaborate conversion system has been developed involving "motion compensated temporal interpolation". To convert 60 Hz 2:1 format video to 24 Hz film, the process involves: (i) producing progressive scan frames at 60 frames/s from one or three of the input 60 fields/s fields depending upon motion in the input fields; (ii) detecting motion in areas of the image between pairs of temporally adjacent progressive scan frames; (iii) producing output frames at 24 frames/s, four for every ten progressive scan frames, with each pixel of each output frame derived from pixels in a respective pair of the progressive scan frames spatially displaced from the output pixel in dependence upon the detected motion and the temporal misalignment between the output frame and the pair of frames from which is it formed; and (iv) recording the output frames on film. Thus, the motion in the image is analysed and interpolation of each pixel is performed along the direction of motion.

Such a system for converting 60 Hz 2:1 interlace format video to 24 Hz film is described in detail in patent application GB 2231228A. The system gives output pictures of extremely high quality in which dynamic resolution is preserved and motion is very smooth. However, the process can be labour intensive, and the equipment is complex, bulky and expensive.

In a different technical field of film-to-film conversion, it is known from patent specification U.S. Pat. No. 4,889,423 to convert 60 frame/s film to 24 frame/s film using an optical process. In a series of five input frames of the 60 frame/s film and two corresponding output frames of the 24 frame/s film, the image of the first output frame is produced so that one portion of its exposure includes the image of the first input frame and the other portion of its exposure includes the image of the second input frame. The third input frame is not used; and the image of the second input frame is produced so that one portion of its exposure includes the image of the fourth input frame and the other portion of its exposure includes the image of the fifth input frame.

SUMMARY OF THE INVENTION

It is an object of the present invention to provide a video-to-film conversion process and apparatus which provides higher quality pictures than the simple field-combined drop-field process but which involves only modest processing complexity.

According to a first aspect of the present invention there is provided a method of converting a 60 field/s 2:1 interlaced digital video signal to 24 frame/s film, comprising the steps, for each sequence of five input fields, of: progressive scan converting each of one pair of the five input fields to form one pair of intermediate frames; combining the intermediate frames of said one pair to form one output video frame such that the value of each pixel at a respective location in said one output frame is a weighted combination of the values of the pixels at the same locations in the intermediate frames of said one pair; progressive scan converting each of another pair of the five input fields to form another pair of intermediate frames; combining the intermediate frames of said other pair to form another output video frame such that the value of each pixel at a respective location in said other output frame is a weighted combination of the values of the pixels at the same locations in the intermediate frames of said other pair; and recording said one and said other output video frames on film. The effect of the weighted combination of the intermediate frames is to shift the temporal centroid of the output video frame so that it is between the temporal centroids of the input fields and the intermediate frames and thus it is possible to soften the potential 12 Hz motion judder as compared with that which arises in the known field-combined drop-field process.

By suitable choice of the weighting coefficients, the temporal centroids of the output frames become equally spaced so as to maximise the softening of the 12 Hz judder. To this end, in the first aspect of the invention, preferably the intermediate frames of said one pair are combined with weightings of i and $(1-i)$, respectively, where i is greater than one-half and less than unity; the intermediate frames of said other pair are combined with weightings of $(i-0.5)$ and $(1.5-i)$, respectively; and said other pair of input fields immediately succeeds said one pair of input fields in the five field sequence.

It is not necessary to progressive scan convert the input fields and subsequently make a weighted combination of them, provided that proper account is taken of the difference in polarity between pairs of the input fields. Thus, according to a second aspect of the present invention, there is provided a method of converting a 60 field/s 2:1 interlaced digital video signal to 24 frame/s film, comprising the steps, for each sequence of five input fields, of: combining the fields of one pair of the five input fields to form one output video frame such that the value of each pixel at a respective location in said one output frame is a weighted combination of the value of the pixel at the same location in one of the fields of said one pair and the values of the pixels at locations above and below that location in the other field of said one pair; combining the fields of another pair of said five input fields to form another output video frame such that the value of each pixel at a respective location in said other output frame is a weighted combination of the value of the pixel at the same location in one of the fields of said other pair and the values of the pixels at locations above and below that location in the other field of said other pair; and recording said one and said other output video frames on film.

Again, by suitable choice of the weighting coefficients, the temporal centroids of the output frames become equally spaced so as to maximise the softening of the 12 Hz judder. To this end, in the second aspect of the invention, preferably the fields of said one pair are combined with weightings of i and $(1-i)$, respectively, where i is greater than one-half and less than unity; the fields of said other pair are combined with weightings of $(i-0.5)$ and $(1.5-i)$, respectively; and said other pair of input fields immediately succeeds said one pair of input fields in the five field sequence.

In either of these two aspects of the invention, preferably i is 0.75 so that the weightings are 0.75 and 0.25 in production of said one output frame and 0.25 and 0.75 in producing said other output frame. The weighted combination of frames or fields will introduce some interlace smear into the picture in areas of motion, but with this value of i, the interlace smear introduced into the said one output frame is equal to that introduced into said other output frame, and therefore possibly noticeable modulation of the interlace smear is avoided. However, other values of i may be chosen.

It is not necessary to use two pairs of frames or fields in producing each pair of output frames, and in accordance with a third aspect of the invention, there is provided a method of converting a 60 field/s 2:1 interlaced digital video signal to 24 frame/s film, comprising the steps, for each sequence of five input fields, of: progressive scan converting each of one pair of the five input fields to form one pair of intermediate frames; combining the intermediate frames of said one pair to form one output video frame such that the value of each pixel at a respective location in said one output frame is a combination of the values of the pixels at the same locations in the intermediate frames of said one pair; progressive scan converting a further one of the five input fields to form a further output frame; and recording said one and said further output video frames on film. Because a weighted combination of two progressive scan format frames is not required in producing said further output frame, the method will not introduce interlace smear into that frame, which renders it suitable for use as a publicity shot or "stills".

Again, by suitable choice of the weighting coefficients, the temporal centroids of the output frames become equally spaced so as to maximise the softening of the 12 Hz judder. To this end, in the third aspect of the invention, preferably the intermediate frames of said one pair are combined with equal weighting; and said further output field is spaced from said one pair of input fields by one field in the five field sequence.

Again, it is not necessary to progressive scan convert said one pair of input fields and subsequently make a weighted combination of them, provided that proper account is take of the difference in polarity between pairs of the input fields. Thus, according to a fourth aspect of the present invention, there is provided a method of converting a 60 field/s 2:1 interlaced digital video signal to 24 frame/s film, comprising the steps, for each sequence of five input fields, of: combining the fields of one pair of the five input fields to form one output video frame such that the value of each pixel at a respective location in said one output frame is a combination of the value of the pixel at the same location in one of the fields of said one pair and the values of the pixels at locations above and below that location in the other field of said one pair; progressive scan converting a further one of said five input fields to form a further output video frame; and recording said one and said further output video frames on film.

Again, by suitable choice of the weighting coefficients, the temporal centroids of the output frames become equally spaced so as to maximise the softening of the 12 Hz judder. To this end, in the fourth aspect of the invention, preferably the fields of said one pair are combined with equal weighting; and said further input field is spaced from said one pair of input fields by one field in the five field sequence.

In the progressive scan conversion steps mentioned above, the conversion may simply comprise intra-field vertical interpolation of the respective input field. Alternatively, it may comprise intra-field vertical interpolation of the respective field and/or inter-field temporal interpolation between the input fields preceding and succeeding the respective field according to a degree of detected motion in the picture represented by the input video signal, for example as described in detail in patent application GB2231228A, especially with reference to FIGS. 5 to 14 thereof.

In accordance with a fifth aspect of the invention, there is provided an apparatus adapted to perform the method of any one, or selectively of any two or more, of the above mentioned aspects of the invention.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
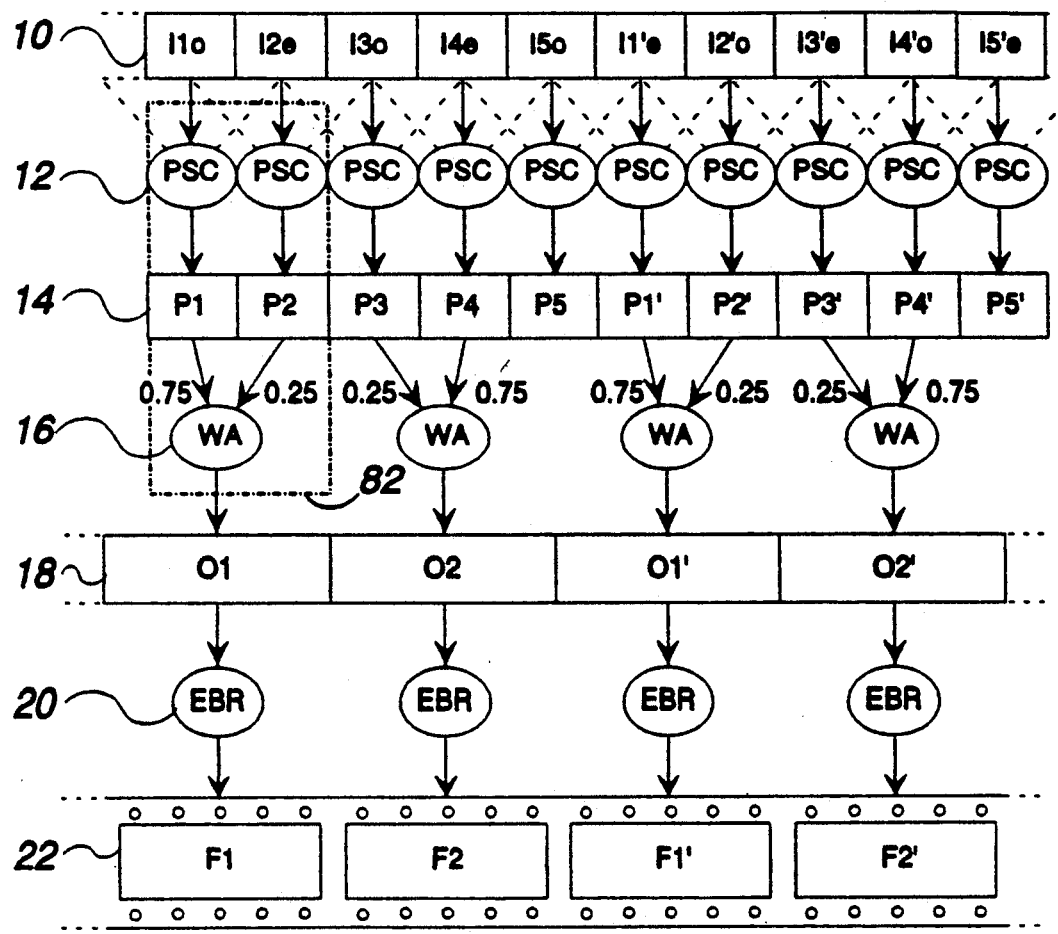
FIG. 1 schematically illustrates the conversion of a sequence of ten input video fields to four output film frames according to one method in accordance with the invention.

Referring to FIG. 1, the row 10 shows a sequence of ten input digital video fields I1 to I5 and I1' to I5'. The input fields are alternately of odd and even polarity, that is to say input fields I1, I3, I5, I2' and I4' contain odd lines of respective video frames, and input fields I2, I4, I1', I3' and I5' contain the even lines of those video frames. The input video signal may be in, for example, SMPTE 240M format, which is a high definition format characterised by 1125 lines per frame, 60 fields per second and a 2:1 interlace. Each frame has 1035 active lines, and therefore each field has between 517 and 518 lines.

Each of the input fields is progressive scan converted, as shown in row 12 in FIG. 1, to produce a respective full frame P1 to P5 and P1' to P5', as shown in row 14 in FIG. 1, each with 1035 active lines. The progressive scan conversion may simply involve intra-field vertical interpolation to produce the frames. Alternatively, it may involve motion adaptive intra-field and inter-field interpolation, as described in detail in patent application GB 2231228A, especially with reference to FIGS. 5 to 14 thereof, and as illustrated schematically by the dotted lines between rows 10 and 12 in FIG. 1 of this application.

In each sequence of five progressive scan converted frames P1 to P5 (or P1' to P5'), the first two frames P1, P2 are processed, as shown in row 16 in FIG. 1, to produce an output video frame O1, as shown in row 18 of FIG. 1. The third and fourth frames P3, P4 are processed to produce an output video frame O2; and the fifth frame P5 is "dropped". The output video frame O1 is produced by adding the frames P1, P2, pixel-by-pixel, with weightings of 0.75 and 0.25. Thus, the value O1(x,y) of a pixel at location (x,y) in output video frame O1 is calculated to be equal to 0.75P1(x,y)+0.25P2(x,y), where P1(x,y) is the value of the pixel at the same location (x,y) in the progressive scan converted frame P1, and P2(x,y) is the value of the pixel at the same location (x,y) in the progressive scan converted frame P2. The output video frame O2 is producing by adding the progressive scan converted frames P3, P4, pixel-by-pixel, with weightings of 0.25 and 0.75. Therefore, O2(x,y)=0.25P3(x,y)+0.75P4(x,y).

The output video frames O1, O2 are then used by an electron beam recorder EBR, as shown in row 20 in FIG. 1, or other video-to-film transfer device, to produce two output film frames F1, F2, as shown in row 22 in FIG. 1.

The process described above for converting the input video fields I1 to I5 to output film frames F1, F2 is then repeated for the next five input video fields I1' to I5' to produce the next two film frames F1', F2', and so on.

By producing the output frames in the above manner, it can be considered that the "temporal centroids" of the output frames O1, O1' are located one-quarter of the way between the temporal centroids of the input fields I1o, I2e, and I1'e, I2'o, and that the temporal centroids of the output frames O2, O2' are located three-quarters of the way between the temporal centroids of the input fields I3o, I4e, and I3'e, I4'o. Therefore, the temporal centroids of the output frames O1, O2, O1', O2' are equally spaced, with a spacing of 1/24 second.

Although, in FIG. 1, it is shown that the fifth input field I5 is progressive scan converted and then dropped, this input video field may be dropped before any progressive scan conversion takes place.

In general, any weightings i and (1−i), where i is greater than one-half and less than unity, may be used for producing the output video frame O1 from the frames P1, P2, and the weightings to be used for producing the output video frame O2 from the frames P3, P4 are then (i−0.5) and (1.5−i). However, the weightings of 0.75 and 0.25, and 0.25 and 0.75 as explained above with reference to FIG. 1 are preferred for three reasons. Firstly, in order to perform the method of FIG. 1, it is necessary merely to reverse the weighting coefficients with each output video frame which is produced. Secondly, when converting a picture with areas of motion, the apparent interlace smear which will be introduced into output video frame O1 will be equal to that which is introduced into output video frame O2. Thirdly, multiplication of a digital value by 0.25 and by 0.75 is easily achieved: multiplication by 0.25 involving a shift of 2 bits to the right, and multiplication by 0.75 involving accumulation of a 1 bit right shift with a further 1 bit right shift.

Figure 2:
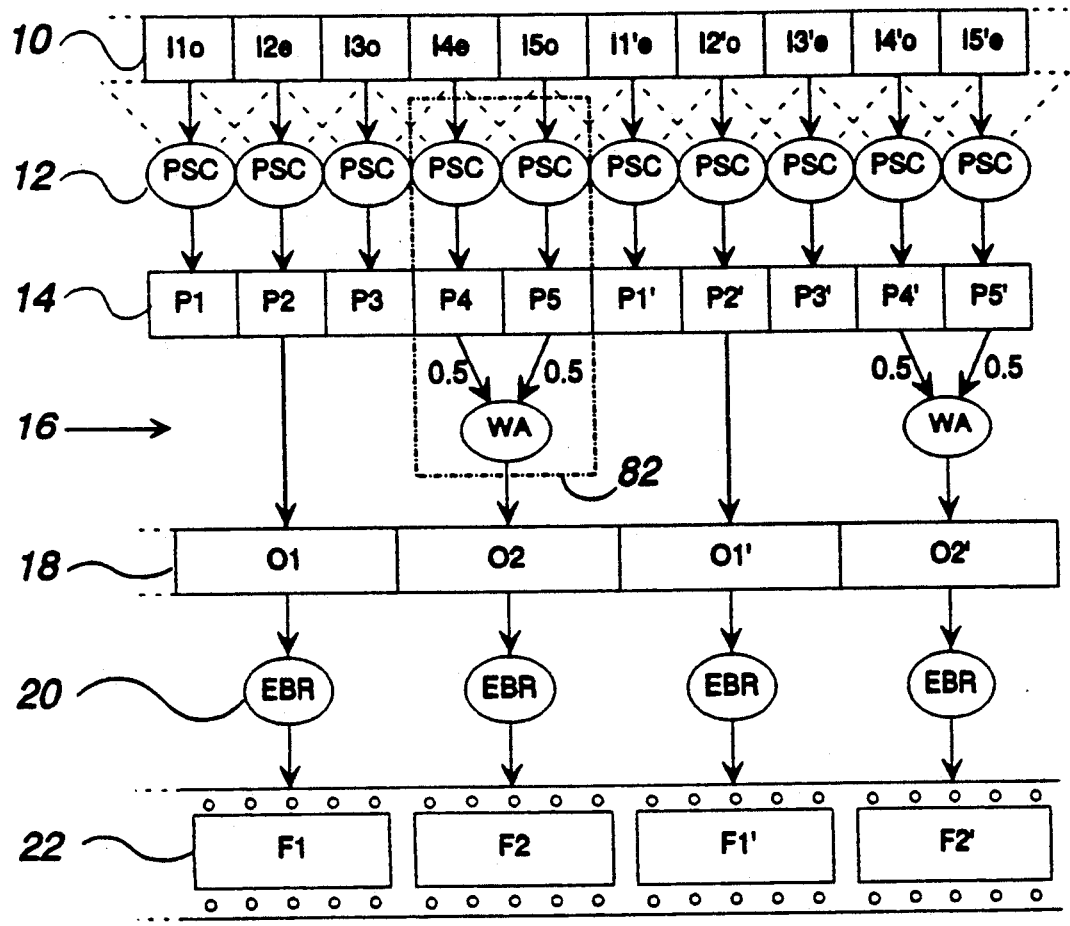
FIG. 2 is similar to FIG. 1, but illustrating a second method in accordance with the invention.

The method which is shown in FIG. 2 is somewhat similar to that described above with reference to FIG. 1, with the exception that only one O2 of each pair of output video frames O1, O2 is produced with a temporal centroid offset from the temporal centroids of the input fields. More specifically, as shown in rows 14 to 18 in FIG. 2, the second progressive scan converted frame P2 of the sequence of five progressive scan converted frames P1 to P5 is directly used to produce the output video frame O1. The first and third progressive scan converted frames P1, P3 are "dropped". The second output video frame O2 is produced by adding the fourth and fifth progressive scan converted frames P4, P5, pixel-by-pixel, with equal weightings of 0.5 and 0.5. Therefore, O2(x,y)=(0.5P4(x,y)+0.5P5(x,y). Again the temporal centroids of the output frames O1, O2, O1', O2' are equally spaced with a spacing of 1/24 second.

Although, in FIG. 2, it is shown that the first and third input fields I1, I3 are progressive scan converted and then dropped, these input video fields may be dropped before any progressive scan conversion takes place.

The method of FIG. 2 suffers from greater apparent interlace smear modulation compared with the method of FIG. 1. However, the method of FIG. 2 provides three advantages. Firstly no interlace smear is introduced into every alternate one O1 of the output frames O1, O2, and therefore alternate film frames are particularly suitable for use in the production of publicity shots or "stills". Secondly, only three out of every five fields need to be progressive scan converted, as compared with four out of every five for the method of FIG. 1. Thirdly, multiplication by the weighting coefficients is trivial, merely requiring a one bit right shift.

Figure 3:
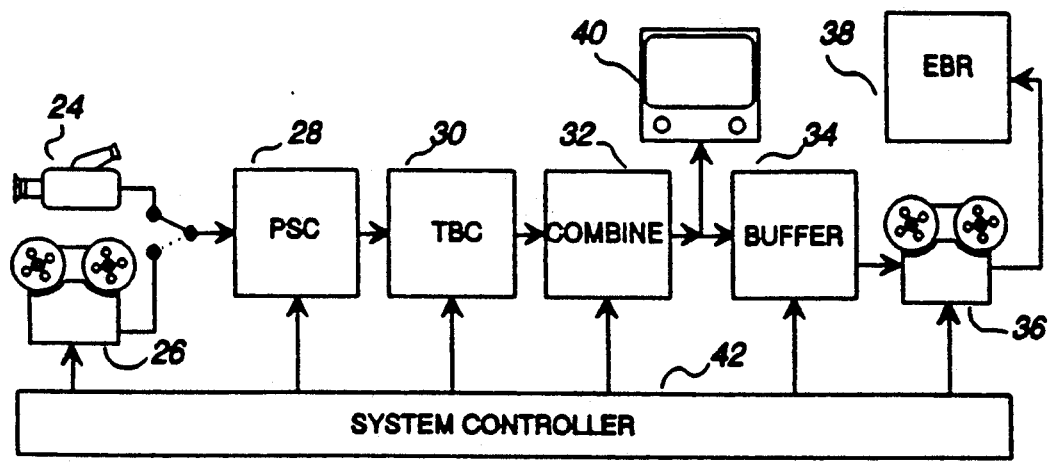
FIG. 3 is a schematic drawing showing an apparatus in accordance with the invention.

Referring to FIG. 3, an apparatus for performing the above methods is shown. A progressive scan converter 28 receives the high definition digital video signal either from a high definition video camera 24 or a high definition video tape recorder 26. The converter 28 performs progressive scan conversion on each of the input video fields, for example in the manner described in detail with reference to FIGS. 5 to 14 of patent application GB 2231228A. The progressive scan converted frames are supplied to a time base changer 30, which supplies a pair of frames (or if appropriate one frame) at a time to a frame combiner 32. The combined frames are then supplied to a buffer 34, which then supplies the frames to a high definition digital video tape recorder 36. The recorded frames are then reproduced by the recorder 36 and supplied to the electron beam recorder 38 which records each pair of pseudo-interlaced fields as a frame on photographic film. A monitor 40 may be provided to monitor the combined frames provided by the combiner 32. A system controller 42 is provided for controlling the various elements of the apparatus.

The recorder 36 may be a 24 frame/s recorder operating continuously in which case the buffer 34 would need of capacity of only one or two frames. Alternatively, the recorder 36 may be a 60 field/s machine arranged to record the frames in burst mode as pseudo-interlaced fields and as if they were still 60 field/s 2:1 video. The buffer 34 would then need a greater capacity. As a further alternative, a 60 field/s machine may be used and a 3232 pulldown format may be employed. That is to say, for each four real fields, an additional dummy or phantom field is recorded. Then, on reproduction, only the four real fields are passed to the electron beam recorder for exposing the film, and the phantom field is dropped. This enables the 60 field/s recorder 36 to be operated continuously, and the buffer 34 needs a capacity of only one or two frames.

Figure 4:
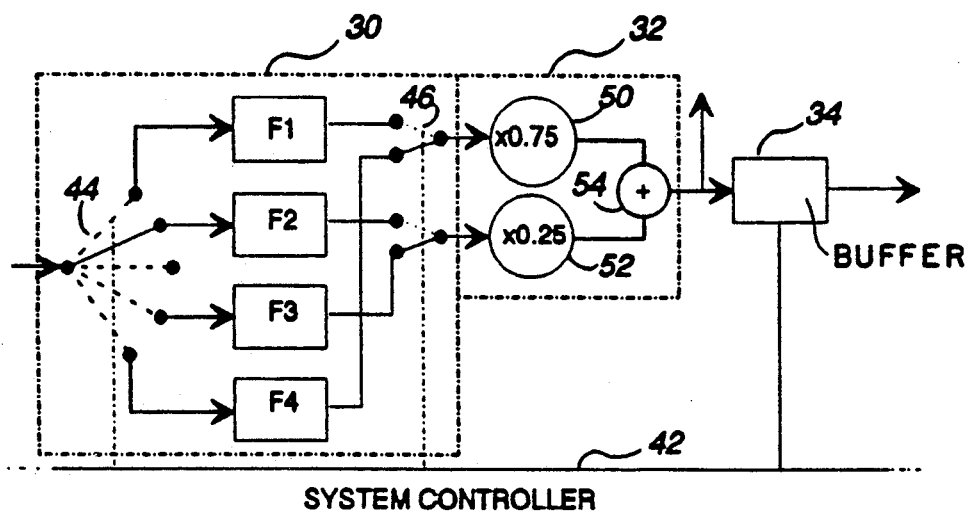
FIG. 4 shows the detail of part of the apparatus of FIG. 3, for performing the first method.

The time base changer 30 and frame combiner 32 for performing the method of FIG. 1 are shown in more detail in FIG. 4. The progressive scan converted frames from the converter 28 are supplied to a switch 44, which is controlled so that in each sequence of five progressive scan converted frames P1 to P5: the first frame P1 is stored in a frame store F1; the second frame P2 is stored in a frame store F2; the third frame P3 is stored in a frame store F3; the fourth frame P4 is stored in a fourth frame store F4; and the fifth frame P5 is not stored, i.e. it is dropped, or as said before need not be produced in the first place. The frame stores F1 and F4 are connected via a changeover switch 46 to the input of a 0.75 multiplier 50 (which may be implemented by a word shifter and accumulator), which outputs to a first input of an adder 54. The frame stores F2, F3 are connected via another gang of the changeover switch 46 to a 0.25 multiplier 52 (which may be implemented by a word shifter) which feeds another input of the adder 54. The output of the adder 54 is supplied to the buffer 34 which is implemented by a RAM store or frame recorder such as the Sony HDDF 500, depending upon the amount of storage which is required.

Once the converted frames P1, P2 have been stored in the frame stores F1, F2, the frames are output together, pixel-by-pixel, via the switch 46 to the multipliers 50, 52 and the outputs of the multipliers are added by the adder 54 to produce the output video frames 01. Once the output video frame 01 has been output, the switch 46 is changed over so that the converted frames P3, P4 can be output together, pixel-by-pixel, from the frame stores F3, F4 via the switch 46 to the multipliers 50, 52, the outputs of which are added by the adder 54 to produce the second output video frame 02. While frames are being output from the frame stores F1, F2, the other frame stores F3, F4 are being filled, and vice versa.

In a modification to the apparatus of FIG. 4, the frame stores F2, F4 may be omitted, and the apparatus may be controlled so that a frame is output from the frame store F1 in synchronism with the input frame which would have been input to the frame store F2 by the progressive scan converter 28. Similarly, a frame is output from the frame store F3 in synchronism with the frame which would have been input to the frame store F4.

Figure 5:
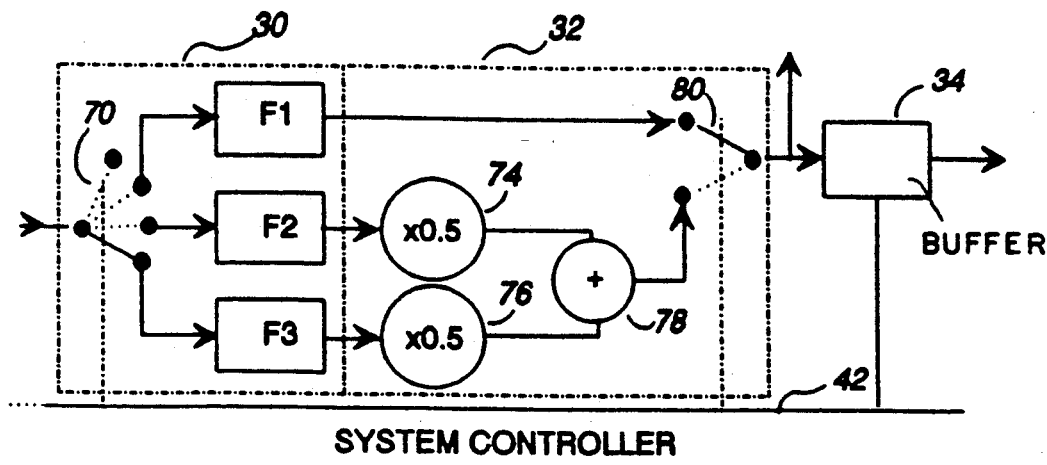
FIG. 5 shows the detail of part of the apparatus of FIG. 3, for performing the second method.

The time base changer 30 and frame combiner 32 for performing the method of FIG. 2 are shown in more detail in FIG. 5. The time base changer 30 of FIG. 7 includes three frame stores F1, F2, F3, which are fed by a switch 70. In each sequence of five progressive scan converted frames P1 to P5: the first frame P1 is dropped, the second frame P2 is supplied to the frame store F1; the third converted frame P3 is dropped; the fourth converted frame P4 is stored in the frame store F2; and the fifth converted frame P5 is stored in the frame store F3. The output from the frame store F1 is via one side of a changeover switch 80 to the buffer frame recorder 34. The frame stores F2, F3 output via respective 0.5 multipliers 74, 76 (implemented by respective shift registers) and an adder 78 to the other side of the changeover switch 80.

In operation of the arrangement of FIG. 5, the frame store F1 simply acts as a buffer and outputs the second converted frame P2 via the switch 80 to the buffer RAM store or frame recorder 34. Once the fourth and fifth converted frames P4, P5 have been stored in the frame stores F2, F3, they are output via the respective multipliers 74, 76 and the adder 78 and changeover switch 80 to the buffer RAM store or frame recorder 34.

In a modification to the apparatus of FIG. 5, the frame stores F1, F3 may be omitted, and the apparatus may be controlled so that an input frame from the progressive scan converter which would have been stored in the frame store F1 is instead passed directly to the buffer RAM store or frame recorder 34. Also a frame is output from the frame store F2 in synchronism with the input frame which would have been input to the frame store F3 by the progressive scan converter 28.

Figure 6:
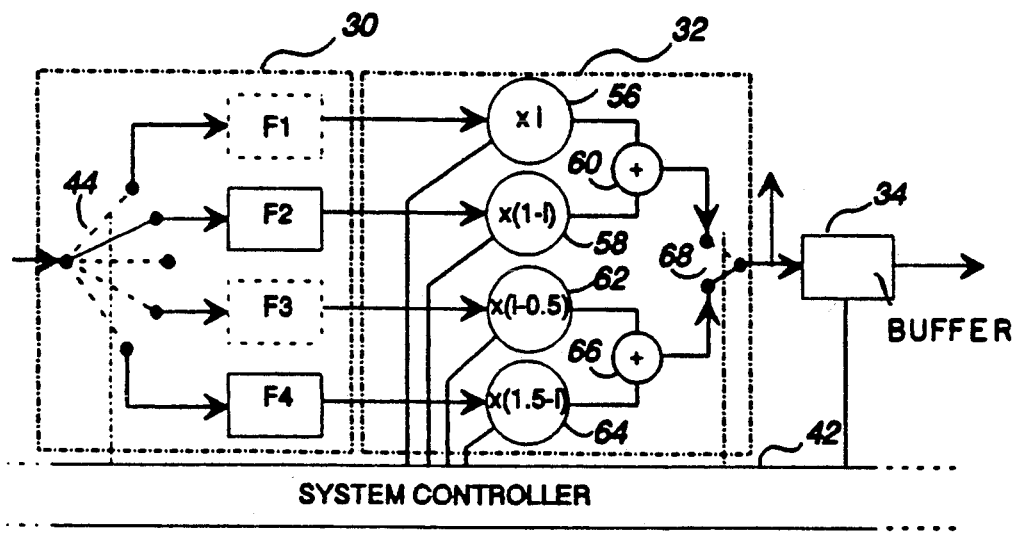
FIG. 6 shows the detail of part of the apparatus of FIG. 3 which can selectively perform the first, second and other methods.

It will be appreciated that a time base changer 30 and frame combiner 32 may be provided which can selectively operate in the manner described with reference to FIG. 4 or 5, or in other manners. Such a time base changer 30 and frame combiner 32 are shown in FIG. 6, which is somewhat similar to FIG. 5. However, the outputs from the frame stores F1 to F4 are fed directly to respective multipliers, namely an i multiplier 56, a $(1-i)$ multiplier 58, an $(i-0.5)$ multiplier 62 and an $(1.5-i)$ multiplier 64. The outputs of the multipliers 56, 58 are added by an adder 60 and supplied to one side of a changeover switch 68. The outputs of the multipliers 62, 64 are supplied to an adder 66, the output of which supplies the other side of the changeover switch 68. The changeover switch 68 then feeds the buffer frame recorder 34. Each of the multipliers 56, 58, 62, 64 receives its multiplication coefficient from the system controller 42, and the switch 44 is operated by the system controller 42 so as to ensure that the progressive scan converted frames are stored in the appropriate frame stores F1 to F4. In order to operate in the manner of the FIG. 4 arrangement, the multiplication coefficients supplied to the multipliers 56, 58, 62, 64 are 0.75, 0.25, 0.25 and 0.75, respectively. In order to operate in the manner of FIG. 5, the multiplication coefficients are 1, 0, 0.5 and 0.5, respectively, and the switch 44 is operated so that: the first and third converted frames P1, P3 are "dropped"; the second converted frame P2 is supplied to the frame store F1, and the fourth and fifth converted frames P4, P5 are supplied to the frame stores F3, F4, respectively.

Again, in a modification to the apparatus of FIG. 6, the frame stores F2, F4 may be omitted, and the apparatus may be controlled so that a frame is output from the frame store F1 in synchronism with the input frame, if any, which would have been input to the frame store F2 by the progressive scan converter 28. Similarly, a frame is output from the frame store P3 in synchronism with the frame which would have been input to the frame store F4.

It will be appreciated that many modifications and developments may be made to the methods and apparatus described above.

For example, referring to FIGS. 1 and 2, progressive scan conversion is firstly carried out, as shown in row 12 in FIGS. 1 and 2, and subsequently weighted addition of the frames is performed, as shown in row 16 in FIGS. 1 and 2. Alternatively, the progressive scan conversion (which may involve purely intra-field interpolation, or which may involve intra-field vertical interpolation and/or inter-field temporal interpolation in dependence upon the degree of motion in the picture, but which in neither case affects the temporal centroid) and the weighted addition (which does shift the temporal centroid) may be performed by a composite 2-D (vertical and temporal) filter 82 as shown by chain lines in FIGS. 1 and 2. In a simple example of such a modification to the method of FIG. 1, and if the odd input fields are considered to have lines numbered 1, 3, 5 . . . and the even input fields to have lines numbered 2, 4, 6 . . . for odd lines (y is odd) in the output video frame O1:

$$O1(x, y) = 0.375(I1o(x, y-1)) + 0.375(I1o(x, y-1)) + 0.125(I2e(x, y+1)).$$

In other words, because I2e(x,y), for y being odd, does not exist in even input field I2e, instead of using a quarter of the value of that non-existent pixel, the sum of one-eighth of the value of the pixel in the line above, (y−1), and one-eighth of the value of the pixel in the line below, (y+1), is used.

Similarly, for even lines (y is even) in output frame O1:

$$O1(x, y) = 0.375(I1o(x, y-1)) + 0.375(I1o(x, y+1)) + 0.250(I2e(x, y)).$$

Four odd lines (y is odd) in output video frame O2:

$$O2(x, y) = 0.250(I3o(x, y)) + 0.375(I4e(x, y-1)) + 0.375(I4e(x, y+1))$$

and for even lines (y is even) in output video frame O2:

$$O2(x, y) = 0.125(I3o(x, y-1)) + 0.125(I3o(x, y+1)) + 0.750(I4e(x, y)).$$

For odd lines (y is odd) in output video frame O1':

$$O1'(x, y) = 0.375(I1'e(x, y-1)) + 0.375(I1e(x, y+1)) + 0.250(I2'o(x, y))$$

and for even lines (y is even) in output video frame O1':

$$O1'(x, y) = 0.750(I1'e(x, y)) + 0.125(I2'o(x, y-1)) + 0.125(I2'o(x, y+1)).$$

For odd lines (y is odd) in output video frame O2':

$$O2'(x, y) = 0.125(I3'e(x, y-1)) + 0.125(I3'e(x, y+1)) + 0.750(I4'o(x, y))$$

and for even lines (y is even) in output video frame O2':

$$O2'(x, y) = 0.250(I3'e(x, y)) + 0.375(I4'o(x, y-1)) + 0.375(I4'o(x, y+1)).$$

In a more complex example, more than two lines (for example four or six lines) of an even input field may be used in forming the contribution of that field to an odd line in an output frame, and vice versa for odd input fields and even lines of the output frames. However, the total weighting of the lines used is preferably equal to the required weighting for the field in question of 0.75 or 0.25, as appropriate.

The method of FIG. 2 may be similarly modified.

In the apparatus described above, real-time conversion may be performed between the input device 24, 26 and the output video tape recorder 36 if the apparatus has sufficient processing power. If it does not, then the video tape recorder 26 may be used as the source, reproducing in slow motion, and a further buffer may be provided between the recorder 26 and the progressive scan converter 28.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What I claim is:

1. A method of converting a 60 field/s 2:1 interlaced digital video signal comprising a plurality of sequences of five input fields to 24 frame/s film, comprising the steps, for each said sequence of five input fields, of:

progressive scan converting each of one pair of the five input fields to form one pair of intermediate frames, each intermediate frame comprising an array of pixels each having a respective value and a respective location in said intermediate frame;

combining the intermediate frames of said one pair to form one output video frame, each output video frame comprising an array of pixels each having a respective value and a respective location in said output frame corresponding to respective locations in said intermediate frames, said value of each pixel in said one output frame being a weighted combination of said values of said pixels at the corresponding locations in said intermediate frames of said one pair;

progressive scan converting each of another pair of the five input fields to form another pair of intermediate frames, each intermediate frame comprising an array of pixels each having a respective value and a respective location in said intermediate frame;

combining the intermediate frames of said other pair to form another output video frame, each output video frame comprising an array of pixels each having a respective value and a respective location in said output frame corresponding to respective locations in said intermediate frames, said value of each pixel in said other output frame being a weighted combination of said values of said pixels at the corresponding locations in said intermediate frames of said other pair; and recording said one and said other output video frames on film.

2. A method as claimed in claim 1, wherein:
said intermediate frames of said one pair are combined with weightings of i and (1−i), respectively, where i is greater than one half and less than unity;
said intermediate frames of said other pair are combined with weightings of (i−0.5) and (1.5−i), respectively; and
said other pair of input fields immediately succeeds said one pair of input fields in said five field sequence.

3. A method as claimed in claim 2, wherein i is 0.75.

4. A method as claimed in claim 1, wherein the or each progressive scan conversion step comprises intra-field vertical interpolation of the respective input field.

5. A method as claimed in claim 1, wherein the or each progressive scan conversion step comprises detecting a degree of motion in the picture represented by the input video signal, and intra-field vertical interpolation of the respective field and/or inter-field temporal interpolation between the input fields preceding and succeeding the respective field according to said degree of detected motion.

6. A method of converting a 60 field/s 2:1 interlaced digital video signal comprising a plurality of sequences of five input fields to 24 frame/s film, each input field comprising an array of pixels each having a value and a respective location in said input field, comprising the steps, for each said sequence of five input fields, of:
combining the fields of one pair of the five input fields to form one output video frame, each output video frame comprising an array of pixels each having a respective value and a respective location in said output frame corresponding to a respective location in one or the other of said one pair of fields, said value of each pixel in said one output frame being a weighted combination of said value of said pixel at the corresponding location in one of said fields of said one pair and the values of the pixels at locations above and below that location in said other field of said one pair;
combining the fields of another pair of said five input fields to form another output video frame, each output video frame comprising an array of pixels each having a respective value and a respective location in said output frame corresponding to a respective location in one or the other of said one pair of fields, said value of each pixel in said other output frame being a weighted combination of said value of said pixel at the corresponding location in one of said fields of said other pair and the values of the pixels at locations above and below that location in said other field of said other pair; and
recording said one and said other output video frames on film.

7. A method as claimed in claim 6, wherein:
said fields of said one pair are combined with weightings of i and (1−i), respectively, where i is greater than one-half and less than unity;
said fields of said other pair are combined with weightings of (i−0.5) and (1.5−i), respectively; and
said other pair of input fields immediately succeeds said one pair of input fields in said five field sequence.

8. A method as claimed in claim 7, wherein i is 0.75.

9. A method of converting a 60 field/s 2:1 interlaced digital video signal comprising a plurality of sequences of five input fields to 24 frame/s film, comprising the steps, for each said sequence of five input fields, of:
progressive scan converting each of one pair of the five input fields to form one pair of intermediate frames;
combining the intermediate frames of said one pair to form one output video frame, each output video frame comprising an array of pixels each having a respective value and a respective location in said output frame corresponding to respective locations in said intermediate frames, said value of each pixel in said one output frame being a combination of said values of said pixels at the corresponding locations in said intermediate frames of said one pair;
progressive scan converting a further one of said five input fields to form a further output frame; and
recording said one and said further output video frames on film.

10. A method as claimed in claim 9, wherein:
said intermediate frames of said one pair are combined with equal weighting; and
said further output field is spaced from said one pair of input fields by one field in the five field sequence.

11. A method as claimed in claim 9, wherein the or each progressive scan conversion step comprises intra-field vertical interpolation of the respective input field.

12. A method as claimed in claim 9, wherein the or each progressive scan conversion step comprises detecting a degree of motion in the picture represented by the input video signal, and intra-field vertical interpolation of the respective field and/or inter-field temporal interpolation between the input fields preceding and succeeding the respective field according to said degree of detected motion.

13. A method of converting a 60 field/s 2:1 interlaced digital video signal comprising a plurality of sequences of five input fields to 24 frame/s film, each input field comprising an array of pixels each having a value and a respective location in said input field, comprising the steps, for each said sequence of five input fields, of:
combining the fields of one pair of said five input fields to form one output video frame, each output video frame comprising an array of pixels each having a respective value and a respective location in said output frame corresponding to a respective location in one or the other of said one pair of fields, said value of each pixel in said one output frame being a combination of said value of said pixel at the corresponding location in one of the fields of said one pair and the values of the pixels at locations above and below that location in said other field of said one pair;
progressive scan converting a further one of said five input fields to form a further output video frame; and
recording said one and said further output video frames on film.

14. A method as claimed in claim 13, wherein:
said fields of said one pair are combined with equal weighting; and
said further input field is spaced from said one pair of input fields by one field in the five field sequence.

15. A method as claimed in claim 9, wherein the or each progressive scan conversion step comprises intra-field vertical interpolation of the respective input field.

16. A method as claimed in claim 13, wherein the or each progressive scan conversion step comprises detecting a degree of motion in the picture represented by the input video signal, and intra-field vertical interpolation of the respective field and/or inter-field temporal interpolation between the input fields preceding and succeeding the respective field according to said degree of detected motion.

17. An apparatus for converting a 60 field/s 2:1 interlaced digital video signal comprising a plurality of sequences of five input fields to 24 frame/s film, comprising:
  means for progressive scan converting each of one pair of the five input fields to form one pair of intermediate frames, each intermediate frame comprising an array of pixels each having a respective value and a respective location in said intermediate frame;
  means for combining the intermediate frames of said one pair to form one output video frame, each output video frame comprising an array of pixels each having a respective value and a respective location in said output frame corresponding to respective locations in said intermediate frames, said value of each pixel in said one output frame being a weighted combination of said values of said pixels at the corresponding locations in said intermediate frames of said one pair;
  means for progressive scan converting each of another pair of the five input fields to form another pair of intermediate frames, each intermediate frame comprising an array of pixels each having a respective value and a respective location in said intermediate frame;
  means for combining the intermediate frames of said other pair to form another output video frame, each output video frame comprising an array of pixels each having a respective value and a respective location in said output frame corresponding to respective locations in said intermediate frames, said value of each pixel in said other output frame being a weighted combination of said values of said pixels at the corresponding locations in said intermediate frames of said other pair; and
  means for recording said one and said other output video frames

18. An apparatus as claimed in claim 17, wherein:
  said intermediate frames of said one pair are combined with weightings of i and (1−i), respectively, where i is greater than one-half and less than unity;
  said intermediate frames of said other pair are combined with weightings of (i−0.5) and (1.5−i), respectively; and
  said other pair of input fields immediately succeeds said one pair of input fields in said five field sequence.

19. An apparatus as claimed in claim 18, wherein i is 0.75.

20. An apparatus as claimed in claim 17, wherein the progressive scan conversion means comprise means for intra-field vertical interpolating the respective input field.

21. An apparatus as claimed in claim 17, wherein the progressive scan conversion means comprise means for detecting a degree of motion in the picture represented by the input video signal, and means for intra-field vertical interpolating the respective field and/or inter-field temporally interpolating between the input fields preceding and succeeding the respective field according to said degree of detected motion.

22. An apparatus for converting a 60 field/s 2:1 interlaced digital video signal comprising a plurality of sequences of five input fields to 24 frame/s film, each input field comprising an array of pixels each having a value and a respective location in said input field, comprising:
  means for combining the fields of one pair of the five input fields to form one output video frame, each output video frame comprising an array of pixels each having a respective value and a respective location in said output frame corresponding to a respective location in one or the other of said one pair of fields, said value of each pixel in said one output frame being a weighted combination of said value of said pixel at the corresponding location in one of said fields of said one pair and the values of the pixels at locations above and below that location in said other field of said one pair;
  means for combining the fields of another pair of said five input fields to form another output video frame, each output video frame comprising an array of pixels each having a respective value and a respective location in said output frame corresponding to a respective location in one or the other of said one pair of fields, said value of each pixel in said other output frame being a weighted combination of said value of said pixel at the corresponding location in one of said fields of said other pair and the values of the pixels at locations above and below that location in said other field of said other pair; and
  means for recording said one and said other output video frames on film.

23. An apparatus as claimed in claim 22, wherein:
  said fields of said one pair are combined with weightings of i and (1−i), respectively, where i is greater than one-half and less than unity;
  said fields of said other pair are combined with weightings of (i−0.5) and (1.5−i), respectively; and
  said other pair of input fields immediately succeeds said one pair of input fields in said five field sequence.

24. An apparatus as claimed in claim 23, wherein i is 0.75.

25. An apparatus for converting a 60 frame/s 2:1 interlaced digital video signal comprising a plurality of sequences of five input fields to 24 frame/s film, comprising the steps, for each said sequence of five input fields, of:
  means for progressive scan converting each of one pair of the five input fields to form one pair of intermediate frames;
  means for combining the intermediate frames of said one pair to form one output video frame, each output video frame comprising an array of pixels each having a respective value and a respective location in said output frame corresponding to respective locations in said intermediate frames, said value of each pixel in said one output frame being a combination of said values of said pixels at the corresponding locations in said intermediate frames of said one pari;
  means for progressive scan converting a further one of said five fields to form a further output frame; and means for recording said one and said further output video frames on film.

26. An apparatus as claimed in claim 25, wherein:
said intermediate frames of said one pair are combined with equal weighting; and
said further output field is spaced from said one pair of input fields by one field in the five field sequence.

27. An apparatus as claimed in claim 25, wherein the progressive scan conversion means comprise means for intra-field vertical interpolating the respective input field.

28. An apparatus as claimed in claim 25, wherein the progressive scan conversion means comprise means for detecting a degree of motion in the picture represented by the input video signal, and means for intra-field vertical interpolating the respective field and/or inter-field temporally interpolating between the input fields preceding and succeeding the respective field according to said degree of detected motion.

29. An apparatus for converting a 60 field/s 2:1 interlaced digital video signal comprising a plurality of sequences of five input fields to 24 frame/s film, each input field comprising an array of pixels each having a value and a respective location in said input field, comprising the steps, for each said sequence of five input fields, of:
means for combining the fields of one pair of said five input fields to form one output video frame, each output video frame comprising an array of pixels each having a respective value and a respective location in said output frame corresponding to a respective location in one or the other of said one pair of fields, said value of each pixel in said one output frame being a combination of said value of said pixel at the corresponding location in one of the fields of said one pair and the values of the pixels at locations above and below that location in said other field of said one pair;
means for progressive scan converting a further one of said five input fields to form a further output video frame; and
means for recording said one and said further output video frames on film.

30. An apparatus as claimed in claim 29, wherein:
said fields of said one pair are combined with equal weighting; and
said further input field is spaced from said one pair of input fields by one field in the five field sequence.

31. An apparatus as claimed in claim 29, wherein the progressive scan conversion means comprise means for intra-field vertical interpolating the respective input field.

32. An apparatus as claimed in claim 29, wherein the progressive scan conversion means comprise means for detecting a degree of motion in the picture represented by the input video signal, and means for intra-field vertical interpolating the respective field and/or inter-field temporally interpolating between the input fields preceding and succeeding the respective field according to said degree of detected motion.

* * * * *